United States Patent
Zhang et al.

(10) Patent No.: US 10,811,010 B2
(45) Date of Patent: Oct. 20, 2020

(54) VOICE INTERACTION METHOD AND APPARATUS, TERMINAL, SERVER AND READABLE STORAGE MEDIUM

(71) Applicant: Baidu Online Network Technology (Beijing) Co., Ltd., Beijing (CN)

(72) Inventors: Zhongqi Zhang, Beijing (CN); Tian Wang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 53 days.

(21) Appl. No.: 16/052,253

(22) Filed: Aug. 1, 2018

(65) Prior Publication Data

US 2019/0147868 A1    May 16, 2019

(30) Foreign Application Priority Data

Nov. 16, 2017  (CN) .......................... 2017 1 1139757

(51) Int. Cl.
*G10L 15/22* (2006.01)
*G10L 13/04* (2013.01)
(Continued)

(52) U.S. Cl.
CPC .............. *G10L 15/22* (2013.01); *G06F 3/167* (2013.01); *G10L 13/043* (2013.01);
(Continued)

(58) Field of Classification Search
CPC ......... G10L 15/22; G10L 15/00; G10L 15/08; G10L 15/18; G10L 15/1815;
(Continued)

(56) References Cited

U.S. PATENT DOCUMENTS

2008/0064371 A1 *   3/2008   Madhavapeddi .. G06Q 30/0241
                                                         455/412.1
2010/0240402 A1     9/2010   Wickman et al.
(Continued)

FOREIGN PATENT DOCUMENTS

CN        103914234 A    7/2014
CN        105027574 A    11/2015
(Continued)

OTHER PUBLICATIONS

Notice of Reasons for Refusal dated Sep. 12, 2019 for Japanese Application No. 2018-145053.
(Continued)

*Primary Examiner* — Qi Han
(74) *Attorney, Agent, or Firm* — Akerman LLP

(57) ABSTRACT

A voice interaction method and apparatus, a terminal, a server, and a readable storage medium are provided. The method includes the following steps: obtaining a user's control object and control intention according to the user's voice; determining whether the control object hits an user-selectable notification information pre-stored in a server; performing control corresponding to the control intention on the control object, if the control object hits the user-selectable notification information, under a voice interaction scenario, wherein the user-selectable notification information is notification information which is pre-stored in the server and has a preset rule with respect to the user. Embodiments of the present disclosure improve the user's efficiency in controlling the control object hitting the user-selectable notification information, expand types of control that can be implemented through voice interaction under the voice interaction scenario, and enhance the user's experience under the voice interaction scenario.

12 Claims, 2 Drawing Sheets

(51) Int. Cl.
*G10L 15/30* (2013.01)
*G06F 3/16* (2006.01)
*G10L 15/18* (2013.01)

(52) U.S. Cl.
CPC .......... *G10L 15/1815* (2013.01); *G10L 15/30* (2013.01); *G10L 2015/223* (2013.01)

(58) Field of Classification Search
CPC . G10L 15/1822; G10L 15/26; G10L 2015/22; G10L 2015/00; G10L 2015/06; G10L 2015/08; G10L 2015/223; G10L 2015/228
USPC ............ 704/231, 236, 243, 270, 270.1, 275
See application file for complete search history.

(56) References Cited

U.S. PATENT DOCUMENTS

| | | | | |
|---|---|---|---|---|
| 2011/0087510 | A1* | 4/2011 | Putra | G06Q 10/00 705/7.13 |
| 2012/0028599 | A1* | 2/2012 | Hatton | G08G 1/096716 455/404.2 |
| 2013/0010934 | A1* | 1/2013 | Miller | H04M 1/72519 379/88.01 |
| 2016/0260431 | A1 | 9/2016 | Newendorp et al. | |
| 2017/0346872 | A1* | 11/2017 | Naik | H04L 65/604 |

FOREIGN PATENT DOCUMENTS

| | | |
|---|---|---|
| CN | 105183422 A | 12/2015 |
| CN | 105224278 A | 1/2016 |
| CN | 105284099 A | 1/2016 |
| CN | 105391873 A | 3/2016 |
| CN | 106201177 A | 12/2016 |
| CN | 106463114 A | 2/2017 |
| CN | 107204185 A | 9/2017 |
| JP | 2007538432 A | 12/2007 |
| JP | 2017138698 A | 8/2017 |
| WO | 2016158792 A1 | 10/2016 |

OTHER PUBLICATIONS

Office Action issued in connection with corresponding Chinese Patent Application No. 201711139757.9.

Search Report issued in connection with corresponding Chinese Patent Application No. 201711139757.9.

Search Report dated Jan. 6, 2020 issued in connection with Chinese Patent Application No. 2017111397579.

* cited by examiner

VOICE INTERACTION METHOD AND APPARATUS, TERMINAL, SERVER AND READABLE STORAGE MEDIUM

CROSS-REFERENCE TO RELATED APPLICATION

This application claims priority to Chinese Patent Application No. 201711139757.9, filed on Nov. 16, 2017, which is hereby incorporated by reference in its entirety.

FIELD OF THE DISCLOSURE

The present disclosure relates to the technical field of voice interaction, and particularly to a voice interaction method and apparatus, a terminal, a server, and a readable storage medium.

BACKGROUND OF THE DISCLOSURE

At present, voice interaction as an interaction manner gradually becomes a main stream of human-machine interaction. An operating system for voice interaction also gradually appears in people's life, for example, various voice assistants and so on. Smart devices carrying the operating system for voice interaction can very conveniently obtain desired information by using voice. However, as for the current operating system for voice interaction, under a voice interaction scenario, a user needs to actively obtain or delete notification information pushed by respective services, and can obtain or delete in a graphic interface only if the voice interaction scenario is exited. The operation is complex, reduces the user's experience under the voice interaction scenario, and has technical problems such as inconvenient use and poor user experience.

SUMMARY OF THE DISCLOSURE

Embodiments of the present disclosure provide a voice interaction method and apparatus, a terminal, a server, and a readable storage medium, to at least solve the above one or more technical problems.

In a first aspect, embodiments of the present disclosure provide a voice interaction method, the method including the following steps:

obtaining a user's control object and control intention according to the user's voice;

determining whether the control object hits an user-selectable notification information pre-stored in a server;

performing control corresponding to the control intention on the control object if the control object hits the user-selectable notification information, under a voice interaction scenario, wherein the user-selectable notification information is notification information which is pre-stored in the server and has a preset rule with respect to the user.

In a second aspect, embodiments of the present disclosure provide a voice interaction apparatus, the apparatus including:

a storage module configured to store notification information;

an obtaining module configured to obtain a user's control object and control intention according to the user's voice;

a control module configured to determine whether the control object hits an user-selectable notification information pre-stored in a server, and perform control corresponding to the control intention on the control object if the control object hits the user-selectable notification information, under a voice interaction scenario;

wherein the user-selectable notification information is notification information which is pre-stored in the server and has a preset rule with respect to the user.

In a third aspect, embodiments of the present disclosure provide a terminal, the terminal including:

one or more processors, a storage device for storing one or more programs, the one or more programs, when executed by said one or more processors, enable said one or more processors to implement the method according to the first aspect.

In a fourth aspect, embodiments of the present disclosure provide a server, the server including:

one or more processors, a storage device for storing one or more programs, and notification information;

the one or more programs, when executed by said one or more processors, enable said one or more processors to implement the method according to the first aspect.

In a fifth aspect, embodiments of the present disclosure provide a computer readable storage medium in which a computer program is stored, wherein the computer program, when executed by a processor, implements the method according to the first aspect.

A technical solution among the above technical solutions has the following advantages or advantageous effects: according to the user's control object and control intention, when the control object hits the user-selectable notification information, the server performs control corresponding to the control intention on the control object; thereby improving the user's efficiency in controlling the user-selectable notification information hit by the control object, expanding types of control that can be implemented through voice interaction under the voice interaction scenario, and enhancing the user's experience under the voice interaction scenario.

Another technical solution among the above technical solutions has the following advantages or advantageous effects: the control module performs an operation corresponding to the control intention on the control object, thereby achieving the user's control of the notification information hit by the control object through voice under the voice interaction scenario, improving the efficiency of the voice interaction apparatus of the embodiment of the present disclosure in controlling the notification information hit by the control object, then thereby expanding types of control that can be implemented through voice interaction under the voice interaction scenario, and enhancing the user's experience under the voice interaction scenario.

The above summary is only intended for description purpose, not to limit in any manner. In addition to illustrative aspects, implementation modes and features described above, further aspects, implementation modes and features of the present disclosure will be made apparent by referring to drawings and the following detailed depictions.

BRIEF DESCRIPTION OF DRAWINGS

In the figures, unless otherwise specified, the same reference numbers throughout a plurality of figures represent the same or like components or elements. These figures are not certainly drawn by scale. It should be appreciated that these figures only depict some embodiments according to the present disclosure, and should not be considered as limiting the scope of the present disclosure.

LISTING OF REFERENCE NUMBERS

100 user storage unit, 110 queue unit, 111 unread notification information queue, 112 already-read notification information queue;

210 storage module, 220 obtaining module, 230 control module;

310 a processor of a terminal, 320 a storage device of the terminal;

410 a processor of a server, 420 a storage device of the server.

DETAILED DESCRIPTION OF PREFERRED EMBODIMENTS

The following text only simply describes some exemplary embodiments. As recognized by those skilled in the art, it is possible to modify the described embodiments in various manners without departing from the spirit or scope of the present disclosure. Hence, the figures and description are considered as being substantially exemplary not restrictive.

Embodiment 1

Figure 1:
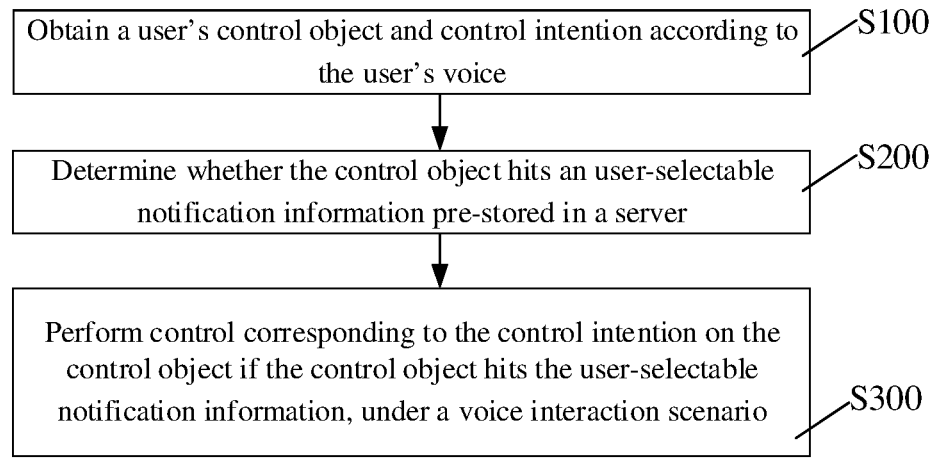
FIG. 1 is a schematic flow chart of a voice interaction method according to Embodiment 1 of the present disclosure.

The present embodiment of the present disclosure provides a notification information control method for voice interaction. As shown in FIG. 1, the method includes steps S100-S300.

Step S100, a user's control object and control intention are obtained according to the user's voice.

In an example of the present embodiment of the present disclosure, the user's voice is obtained by a terminal that can obtain the user's voice data, wherein the terminal includes but is not limited to devices such as a smart phone, a tablet computer, a smart robot and so on; it is possible to use a variety of voice recognition technologies to parse the user's voice so as to obtain the user's control object and control intention. As an alternative manner, it is possible to upload the user's voice to a cloud server for parsing, and obtain the user's demand through a parsed result. In an embodiment, originally-obtained user's voice data is processed to reduce the size of data uploaded to the cloud server.

Step S200, it is determined whether the control object hits an user-selectable notification information pre-stored in a server, the server may be a cloud server.

Step S300, under the voice interaction scenario, if the control object hits the user-selectable notification information, the server performs control corresponding to the control intention on the control object, wherein the user-selectable notification information is notification information which is pre-stored in the server and has a preset rule with respect to the user.

According to the user's control object and control intention, when the control object hits the user-selectable notification information, the server performs control corresponding to the control intention on the control object. Thus the voice interaction method of the embodiment of the present disclosure improves the user's efficiency in controlling the user-selectable notification information hit by the control object, expands types of control that can be implemented through voice interaction under the voice interaction scenario, and enhances the user's experience under the voice interaction scenario.

In an example in the embodiment of the present disclosure, the user-selectable notification information is notification information whose push object is the user. In this example, if the user's voice is "is there my notification information", the obtained user's control object is the user's unread notification information, and the control intention is to obtain. If the user's voice is "create an alarm clock", the obtained user's control object is an alarm clock. The alarm clock does not hit the user-selectable notification information, so it is not adapted for the voice method of the embodiment of the present disclosure.

In another example in the embodiment of the present disclosure, the user is a parent, another user who has a preset association with the user is for example a child, and then the user-selectable notification information includes notification information whose push objects are the user himself and this child. In this example, if the user's voice is "is there XXX (this child)'s notification information", the obtained user's control object is this child's unread notification information, and the control intention is to obtain.

Embodiment 2

Embodiment 2 of the present disclosure is a case when the user's control intention is to obtain, based on Embodiment 1 of the present disclosure.

Performing control corresponding to the control intention on the control object includes the following steps:

determining whether the control intention is to obtain;

forming play data based on the notification information hit by the control object, and sending the play data to a user-used terminal, if the control intention is to obtain, wherein the play data includes data in a play format supported by the user-used terminal under the voice interaction scenario, and the notification information hit by the control object is notification information involving to the control object.

According to the voice interaction method of the embodiment of the present disclosure, when the control intention is to obtain, the server forms the play data based on the control object, and sends the play data to the user-used terminal, thereby achieving the user's obtainment of the notification information hit by the control object through voice under the voice interaction scenario, improving the user's efficiency in obtaining the notification information hit by the control object, then thereby expanding types of operations that can be implemented through voice interaction under the voice interaction scenario, and enhancing the user's experience under the voice interaction scenario.

The notification information pre-stored in the server takes diverse forms, and might be text, audio, image or the like, and combinations of the aforesaid forms.

The user-used terminal is limited in supporting the play format under the voice interaction scenario. For example, it is possible that a file in an audio and image format can be played, while a file in a text format cannot be played. In this case, if a certain piece of notification information hit by the control object includes text, audio and image, the server will process the text therein to form audio corresponding to the text. That is, the server processes this notification information to form play data including original audio, original image and the audio corresponding to the text. That is to say, forming play data based on notification information hit by the control object at least includes the following step:

processing the text in the notification information to form the audio corresponding to the text.

Again for example, under the voice interaction scenario, only audio in a specific format can be played by the user-used terminal. In this case, if a certain piece of notification information hit by the control object includes audio in another format, the server processes the audio in another format to form audio in a specific format corresponding to the original audio. That is, the server processes the notification information hit by the control object to form notification information play data including the audio in a specific format corresponding to the original audio. That is to say, forming the play data based on the notification information at least includes the following step:

processing a portion of the notification information that is in a play format not supported by the user-used terminal under the voice interaction scenario, to form play data in a play format supported under the voice interaction scenario.

After the server sends the play data to the user-used terminal, preset play rules is used to control the play at the user-used terminal.

The preset play rules may set different play rules for different types of notification information. For example, it is possible that with respect to a certain type of notification information (for example, weather forecast, etc.), the play data of the type of notification information is played immediately after being sent to the user-used terminal, while it is possible that with respect to another type of notification information (for example, a video clip with a large data size), the play data of this type of notification information is played in case of further interaction by the user after being sent to the user-used terminal. The interaction may be either manual interaction or voice interaction.

Furthermore, when the user-used terminal plays play data of a piece of notification information, if the notification information hit by the user's control object is changed at this time according to the user's voice, the server forms play data based on the changed notification information hit by the control object, and sends the play data to the user-used terminal. That is to say, it is feasible to implement, through voice interaction, obtainment of notification information hit by another control object while play data of a piece of notification information is played.

In an example, for example, when the user-used terminal plays weather forecast, and the user does not want to listen to the weather forecast, it is feasible to use "last piece", "next piece" and "final piece" and so on to implement the user's obtainment of notification information hit by the changed control object.

Embodiment 3

Embodiment 3 of the present disclosure is a case when the user's control intention is to delete, based on Embodiment 1 of the present disclosure.

Performing control corresponding to the control intention on the control object includes the following steps:

determining whether the control intention is to delete;

deleting the notification information hit by the control object from the server if the control intention is to delete.

According to the notification information control method for the voice interaction of the embodiment of the present disclosure, if the user's demand is to delete the notification information hit by the control object, the server deletes the notification information hit by the control object to achieve deletion of the notification information, thereby achieving the user's deletion of the notification information hit by the control object through voice under the voice interaction scenario, improving the user's efficiency in deleting the notification information hit by the control object, then thereby expanding types of operations that can be implemented through voice interaction under the voice interaction scenario, and enhancing the user's experience under the voice interaction scenario.

Embodiment 4

Embodiment 4 of the present disclosure is a combination of Embodiment 2 and Embodiment 3 of the present disclosure, and will not be described in detail any more.

Embodiment 5

Embodiment 5 of the present disclosure further specifically defines the notification information selectable by each user, on the basis of Embodiments 1-4 of the present disclosure.

The notification information selectable by each user includes notification information whose push object is the user, and/or notification information whose push object is another user who has a preset association with the user.

For example, the user-selectable notification information is notification information whose push objects are the user himself and another user who has preset association with the user himself. For example, the notification information selectable by a user as a parent includes notification information whose push object is the user himself, and notification information whose push object is an un-grownup user under custody of the user himself. Certainly, it is requisite to establish a preset association between the guardian user and the un-grownup user under the guardian's custody.

In an example, when the selectable notification information is notification information whose push object is the user:

if the user's voice data is "notification information of Service A", the notification information hit by the control object is unread notification information of Service A whose push object is the user;

if the user's voice data is "yesterday's notification information", the notification information hit by the control object is yesterday's unread notification information whose push object is the user;

if the user's voice data is "notification information", the notification information hit by the control object is all unread notification information whose push object is the user;

if the user's voice data is "already-read notification information", the notification information hit by the control object is all already-read notification information whose push object is the user.

Figure 2:
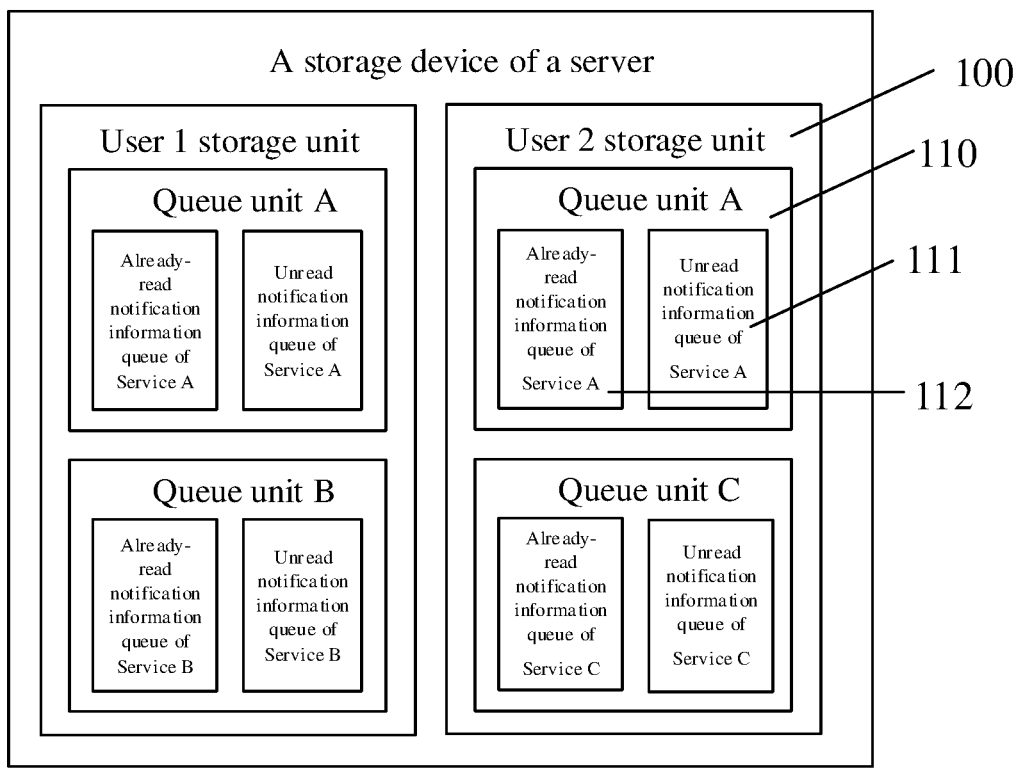
FIG. 2 is a schematic diagram of a storage device of a server in a voice interaction method according to Embodiment 5 of the present disclosure.

There are many manners of storing the notification information on the server. As an optional manner, as shown in FIG. 2, a storage device of the server includes a plurality of user storage units 100 such as a user 1 storage unit and a user 2 storage unit as shown in FIG. 2; the user storage units each include a plurality of queue units 110, for example, queue units A and B of the user 1 storage unit, and queue units A and C of the user 2 storage unit as shown in FIG. 2; the queue units each include an unread notification information queue 111 and an already-read notification information queue 112, for example, already-read notification information queue of Service A, unread notification information queue of Service A of the queue unit A, already-read notification information queue of Service B, and unread notification information queue of Service B of the user 1 storage unit as shown in FIG. 2;

wherein a user storage unit is configured to store notification information whose push object is the same user, a queue unit of the same storage unit is configured to store notification information of the same user and from the same source service, and the unread information queue and the already-read information queue of the same queue unit are respectively configured to store unread notification information and already-read notification information of the same user and from the same source service.

In an example, it is possible to set the already-read notification information to be automatically deleted from the server after a preset time period.

Embodiment 6

Figure 3:
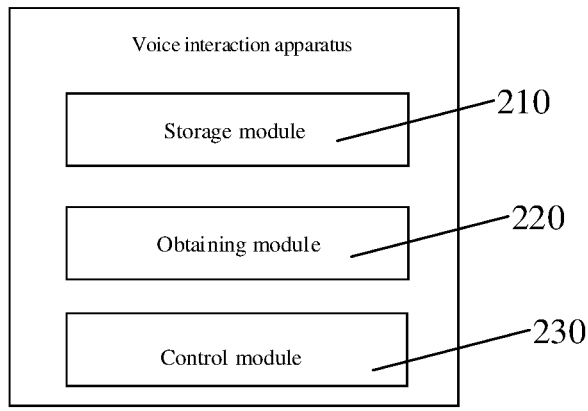
FIG. 3 is a schematic diagram of a voice interaction apparatus according to Embodiment 6 of the present disclosure.

Embodiment 6 of the present disclosure provides a voice interaction apparatus. As shown in FIG. 3, the voice interaction apparatus includes:

a storage module 210 configured to store notification information;

an obtaining module 220 configured to obtain a user's control object and control intention according to the user's voice;

a control module 230 configured to determine whether the control object hits an user-selectable notification information pre-stored in a server, and perform control corresponding to the control intention on the control object if the control object hits the user-selectable notification information, under a voice interaction scenario, wherein the user-selectable notification information is notification information which is pre-stored in the server and has a preset rule with respect to the user.

The voice interaction apparatus of the embodiment of the present disclosure includes the storage module, the obtaining module and the control module. The storage module is configured to store notification information, the obtaining module is configured to obtain the user's control object and control intention according to the user's voice, and the control module is configured to determine whether the control object hits an user-selectable notification information pre-stored in a server, and perform control corresponding to the control intention on the control object if the control object hits the user-selectable notification information, under a voice interaction scenario.

As such, when the user's demand is to control the control object, the control module performs an operation corresponding to the control intention on the control object, thereby achieving the user's control of the notification information hit by the control object through voice under the voice interaction scenario, improving the efficiency of the voice interaction apparatus of the embodiment of the present disclosure in controlling the notification information hit by the control object, then thereby expanding types of control that can be implemented through voice interaction under the voice interaction scenario, and enhancing the user's experience under the voice interaction scenario.

Embodiment 7

Embodiment 7 of the present disclosure differs from Embodiment 6 of the present disclosure in that Embodiment 7 further includes a play module.

Embodiment 7 of the present disclosure further includes a play module.

The control module is further configured to, if the control intention is to obtain, form play data based on control object, and send the play data to the play module;

wherein the play data includes data in a play format supported by the play module under the voice interaction scenario, and the notification information hit by the control object is notification information involving to the control object.

According to the voice interaction apparatus of the embodiment of the present disclosure, when the user's demand is to obtain the notification information hit by the control object, the control module forms the play data based on the notification information hit by the control object, and sends the play data to the play module, thereby achieving the user's obtainment of the notification information hit by the control object through voice under the voice interaction scenario, improving the user's efficiency in obtaining the notification information hit by the control object, then thereby expanding types of operations that can be implemented through voice interaction under the voice interaction scenario, and enhancing the user's experience under the voice interaction scenario.

The notification information pre-stored in the storage module takes diverse forms, and might be text, audio, image or the like, and combinations of the aforesaid forms.

The play module is limited in supporting play format under the voice interaction scenario. For example, it is possible that a file in an audio and image format can be played, and a file in a text format cannot be played. In this case, if a certain piece of notification information hit by the control object includes text, audio and image, the control module will processes the text therein to form audio corresponding to the text. That is, the control module processes the notification information hit by the control object to form notification information play data including original audio, original image and the audio corresponding to the text. That is to say, the control module is at least specifically configured to process the text in the notification information hit by the control object to form the audio corresponding to the text.

Again for example, the play format supported by the play module under the voice interaction scenario is an audio in a specific format that can be played. In this case, if a certain piece of notification information hit by the control object includes audio in another format, the control module processes the audio in that another format to form audio in a specific format corresponding to the original audio. That is, the control module processes the notification information hit by the control object to form notification information play data including the audio in a specific format corresponding to the original audio. That is to say, the control module is at least specifically configured to process a portion, in a play format not supported by the voice interaction apparatus under the voice interaction scenario, of the notification information which is hit by the control object to form a portion in play format supported under the voice interaction scenario, and thus forming play data based on the notification information.

The preset play rules may be setting different play rules for different types of notification information. For example, it is possible to set for a certain type of notification information (for example, weather forecast etc.) in a way that play data of the type of notification information is played immediately after being sent to the play module, while it is possible to set for another type of notification information (for example, a video clip with a large data size, etc.) in a way that play data of this type of notification information is played in case of further interaction by the user after being sent to the play module. The interaction may be either manual interaction or voice interaction.

Furthermore, when the control module plays play data of a piece of notification information, if at this time according to the user's demand, the notification information hit by the control object is changed, then play data is formed based on the changed notification information hit by the control object, and the play data is sent to the play module. That is to say, it is feasible to implement, through voice interaction, obtainment of another piece of notification information while data of a piece of notification information is played.

In an example, when the voice interaction apparatus plays weather forecast, and the user does not want to listen to the weather forecast, it is feasible to use "last piece", "next piece" and "final piece" and so on to implement the user's obtainment of newly-selected notification information.

Embodiment 8

Embodiment 8 of the present disclosure differs from Embodiment 6 of the present disclosure in the specific function of the control module.

In an example, the control module is further configured to, when the user's control operation for the notification information hit by the control object is deletion, delete the notification information hit by the control object, from the storage module.

According to the voice interaction apparatus of the embodiment of the present disclosure, when the user's demand is to delete the notification information hit by the control object, the control module deletes the notification information hit by the control object to achieve deletion of the notification information hit by the control object, thereby achieving the user's deletion of the notification information hit by the control object through voice under the voice interaction scenario, improving the user's efficiency in deleting the notification information hit by the control object, then thereby expanding types of operations that can be implemented through voice interaction under the voice interaction scenario, and enhancing the user's experience under the voice interaction scenario.

Embodiment 9

Embodiment 9 of the present disclosure is a combination of Embodiment 7 and Embodiment 8 of the present disclosure, and will not be described in detail any more.

Embodiment 10

On the basis of Embodiments 6-9 of the present disclosure, Embodiment 10 of the present disclosure further specifically defines the notification information selectable by each user.

The notification information selectable by each user includes notification information whose push object is the user, and/or notification information whose push object is another user who has a preset association with the user.

For example, the user-selectable notification information is notification information whose push objects are the user himself and another user who has a preset association with the user himself. For example, the notification information selectable by a user as a parent includes notification information whose push object is the user himself, and notification information whose push object is an un-grownup user under custody of the user himself. Certainly, it is requisite to establish a preset association between the guardian user and the un-grownup user under the guardian's custody.

In an example, when the selectable notification information is notification information whose push object is the user:
if the user's voice data is "notification information of Service A", the notification information hit by the control object is unread notification information of Service A whose push object is the user;
if the user's voice data is "yesterday's notification information", the notification information hit by the control object is yesterday's unread notification information whose push object is the user;
if the user's voice data is "notification information", the notification information hit by the control object is all unread notification information whose push object is the user;
if the user's voice data is "already-read notification information", the notification information hit by the control object is all already-read notification information whose push object is the user.

There are many manners of storing the notification information on the storage module. As an optional manner, the storage module includes a plurality of user storage units, the user storage units each include a plurality of queue units, and the queue units each include an unread notification information queue and an already-read notification information queue;
wherein a user storage unit is configured to store notification information whose push object is the same user, a queue unit of the same storage unit is configured to store notification information of the same user and from the same source service, and the unread information queue and already-read information queue of the same queue unit are respectively configured to store unread notification information and already-read notification information of the same user and from the same source service.

In an example, it is possible to set the already-read notification information to be automatically deleted after a preset time period.

Embodiment 11

Figure 4:
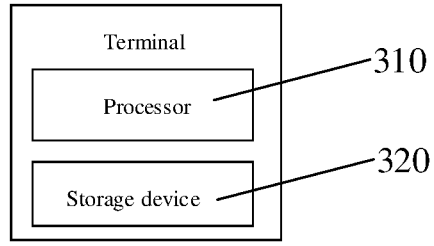
FIG. 4 is a schematic diagram of a terminal according to Embodiment 11 of the present disclosure.

Embodiment 11 of the present disclosure provides a terminal. As shown in FIG. 4, the terminal includes:
one or more processors 310;
a storage device 320 for storing one or more programs;
the one or more programs, when executed by said one or more processors, enable said one or more processors to implement the method of any of Embodiment 1 to Embodiment 5 of the present disclosure.

Embodiment 12

Figure 5:
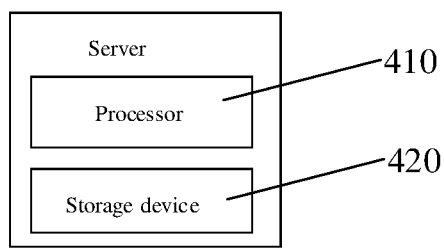
FIG. 5 is a schematic diagram of a server according to Embodiment 12 of the present disclosure.

Embodiment 12 of the present disclosure provides a server. As shown in FIG. 5, the server includes:

one or more processors 410;

a storage device 420 for storing one or more programs, and notification information;

the one or more programs, when executed by said one or more processors, enable said one or more processors to implement the method of any of Embodiment 1 to Embodiment 5 of the present disclosure.

Embodiment 13

The embodiment 13 of the present disclosure provides a computer readable storage medium in which a computer program is stored, wherein the computer program, when executed by a processor, implements the method of any of Embodiment 1 to Embodiment 5 of the present disclosure.

In the depictions of the description, reference throughout this specification to "an embodiment", "some embodiments", "an example", "a specific example", "some examples" or the like means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, those skilled in the art may incorporate or combine different embodiments or examples and features of different embodiments or examples described in the description.

In the depictions of the present disclosure, the phrase "a plurality of" means two or more, unless otherwise definitely and specifically defined.

Any procedure or method described in the flow charts or described in any other way herein may be understood to include one or more modules, portions or parts of executable codes that realize particular logic functions or step of particular procedures. Moreover, the scope of preferred embodiments of the present disclosure includes other implementations in which the order of execution is different from that which is depicted or discussed, including executing functions in a substantially simultaneous manner or in an opposite order according to the related functions. This should be understood by those skilled in the art which embodiments of the present disclosure belong to.

The logic and/or step shown in the flow chart or described in other manners herein, for example, a particular sequence table of executable instructions for realizing the logical function, may be specifically achieved in any computer readable medium to be used by the instruction execution system, device or equipment (such as the system based on computers, the system including processors, or other systems capable of obtaining the instruction from the instruction execution system, device and equipment and executing the instruction), or to be used in combination with the instruction execution system, device and equipment. As to the specification, "the computer readable medium" may be any device adapted for including, storing, communicating, propagating or transferring programs to be used by or in combination with the instruction execution system, device or equipment.

In embodiments of the present disclosure, the computer readable medium may be a computer readable signal medium or a computer readable storage medium or any combination of the two. More specific examples (non-exhaustive list) of the computer readable storage medium at least include: an electronic connection (an electronic device) with one or more wires, a portable computer disc box (a magnetic device), a random access memory (RAM), a read only memory (ROM), an erasable programmable read-only memory (EPROM or a flash memory), an optical fiber device or a portable read-only memory (CDROM). In addition, the computer readable storage medium may even be a paper or other appropriate medium capable of printing programs thereon, this is because, for example, the paper or other appropriate medium may be optically scanned and then edited, decrypted or processed in other appropriate manners when necessary to obtain the programs in an electric manner, and then the programs may be stored in the computer memories.

In embodiments of the present disclosure, the computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, input method or device or a combination thereof. The program codes included by the computer-readable medium may be transmitted with any suitable medium, including, but not limited to radio, electric wire, optical cable, radio frequency (RF) or the like, or any suitable combination thereof.

It should be appreciated that each part of the present disclosure may be realized by the hardware, software, firmware or their combinations. In the above embodiments, a plurality of steps or methods may be realized by the software or firmware stored in the memory and executed by the appropriate instruction execution system. For example, if it is realized by the hardware, likewise in another embodiment, it may be realized by one of or a combination of the following techniques known in the art: a discrete logic circuit having a logic gate circuit for realizing a logic function for a data signal, an application-specific integrated circuit having an appropriate combination logic gate circuit, a programmable gate array (PGA), a field programmable gate array (FPGA), etc.

It should be understood by those skilled in the art that all or part of the steps in the method of the above embodiments can be implemented by instructing related hardware via programs, the program may be stored in a computer readable storage medium, and the program implements one step or combinations of the steps of the method when the program is executed.

In addition, function units of the embodiments of the present disclosure may be integrated in a processing module, or these units may be separate physical existence, or two or more units are integrated in a module. The integrated module may be realized in a form of hardware or in a form of a software function module. When the integrated module is realized in a form of the software function module and is sold or used as a standalone product, the integrated module may be stored in a computer readable storage medium. The storage medium stated here may be a read only memory, a magnetic disk, an optical disk or the like.

What are described above are only specific implementation modes of the present disclosure, but the extent of protection of the present disclosure is not limited to this. Without departing from the technical scope revealed by the present disclosure, those skilled in the art can readily envisage various variations or substitutes, which are all covered by the extent of protection of the present disclosure. Hence, the extent of protection of the present disclosure should be subject to the protection scope of the appended claims.

What is claimed is:

1. A voice interaction method, comprising the following steps:
   obtaining a user's control object and control intention according to the user's voice;
   determining whether the control object hits an user-selectable notification information pre-stored in a server; and
   performing control corresponding to the control intention on the control object if the control object hits the user-selectable notification information, under a voice interaction scenario,
   wherein the user-selectable notification information is notification information which is pre-stored in the server and has a preset rule with respect to the user,
   wherein a storage device of the server comprises a plurality of user storage units, each of the user storage units comprises a plurality of queue units, and each of the queue units comprises an unread notification information queue and an already-read notification information queue,
   wherein a user storage unit is configured to store notification information whose push object is the same user, a queue unit of the same storage unit is configured to store notification information of the same user and from the same source service, and the unread information queue and the already-read information queue of the same queue unit are configured to store unread notification information and already-read notification information of the same user and from the same source service, respectively.

2. The method according to claim 1, wherein performing control corresponding to the control intention on the control object comprises the following steps:
   determining whether the control intention is to obtain; and
   forming play data based on the notification information hit by the control object, and sending the play data to a user-used terminal, if the control intention is to obtain,
   wherein the play data comprises data in a play format supported by the user-used terminal under the voice interaction scenario, and the notification information hit by the control object is notification information involving to the control object.

3. The method according to claim 2, wherein forming play data based on the notification information hit by the control object comprises the following step:
   processing a text in the notification information hit by the control object to form an audio corresponding to the text.

4. The method according to claim 2, wherein the method further comprises:
   forming play data based on the changed notification information hit by the control object, and sending the play data to the user-used terminal, when the user-used terminal plays play data of a piece of notification information, and the notification information hit by the control object is changed.

5. The method according to claim 1, wherein performing control corresponding to the control intention on the control object comprises the following steps:
   determining whether the control intention is to delete; and
   deleting the notification information hit by the control object from the server if the control intention is to delete.

6. The method according to claim 1, wherein the notification information selectable by each user comprises notification information whose push object is the user, and/or notification information whose push object is another user who has a preset association with the user.

7. A voice interaction apparatus comprising:
   one or more processors, and
   a storage device for storing one or more programs,
   the one or more programs, when executed by said one or more processors, enable said one or more processors to:
   store notification information;
   obtain a user's control object and control intention according to the user's voice; and
   determine whether the control object hits an user-selectable notification information pre-stored in a server, and perform control corresponding to the control intention on the control object if the control object hits the user-selectable notification information, under a voice interaction scenario,
   wherein the user-selectable notification information is notification information which is pre-stored in the server and has a preset rule with respect to the user,
   wherein a storage device of the server comprises a plurality of user storage units, each of the user storage units comprises a plurality of queue units, and each of the queue units comprises an unread notification information queue and an already-read notification information queue,
   wherein a user storage unit is configured to store notification information whose push object is the same user, a queue unit of the same storage unit is configured to store notification information of the same user and from the same source service, and the unread information queue and the already-read information queue of the same queue unit are configured to store unread notification information and already-read notification information of the same user and from the same source service, respectively.

8. The apparatus according to claim 7, wherein the one or more programs, when executed by said one or more processors, enable said one or more processors further to form play data based on the notification information hit by the control object, and send the play data to the play module,
   wherein the play data comprises data in a play format supported by the play module under the voice interaction scenario, and the notification information hit by the control object is notification information involving to the control object.

9. The apparatus according to claim 8, wherein the one or more programs, when executed by said one or more processors, enable said one or more processors further to process a text in the notification information hit by the control object to form an audio corresponding to the text.

10. The apparatus according to claim 8, wherein the one or more programs, when executed by said one or more processors, enable said one or more processors further to form play data based on the changed notification information hit by the control object, and send the play data to the play module, when the user-used terminal plays play data of a piece of notification information, and the notification information hit by the control object is changed.

11. The apparatus according to claim 7, wherein the one or more programs, when executed by said one or more processors, enable said one or more processors further to delete the notification information hit by the control object from the storage module if the control intention is to delete.

12. A non-transitory computer readable storage medium, wherein a computer program is stored in the non-transitory computer readable storage medium, and the computer program, when executed by a processor, implements the method according to claim 1.

* * * * *